May 29, 1951    J. S. McGUIRE    2,554,787
FISHING ROD HANDLE
Filed Aug. 28, 1948
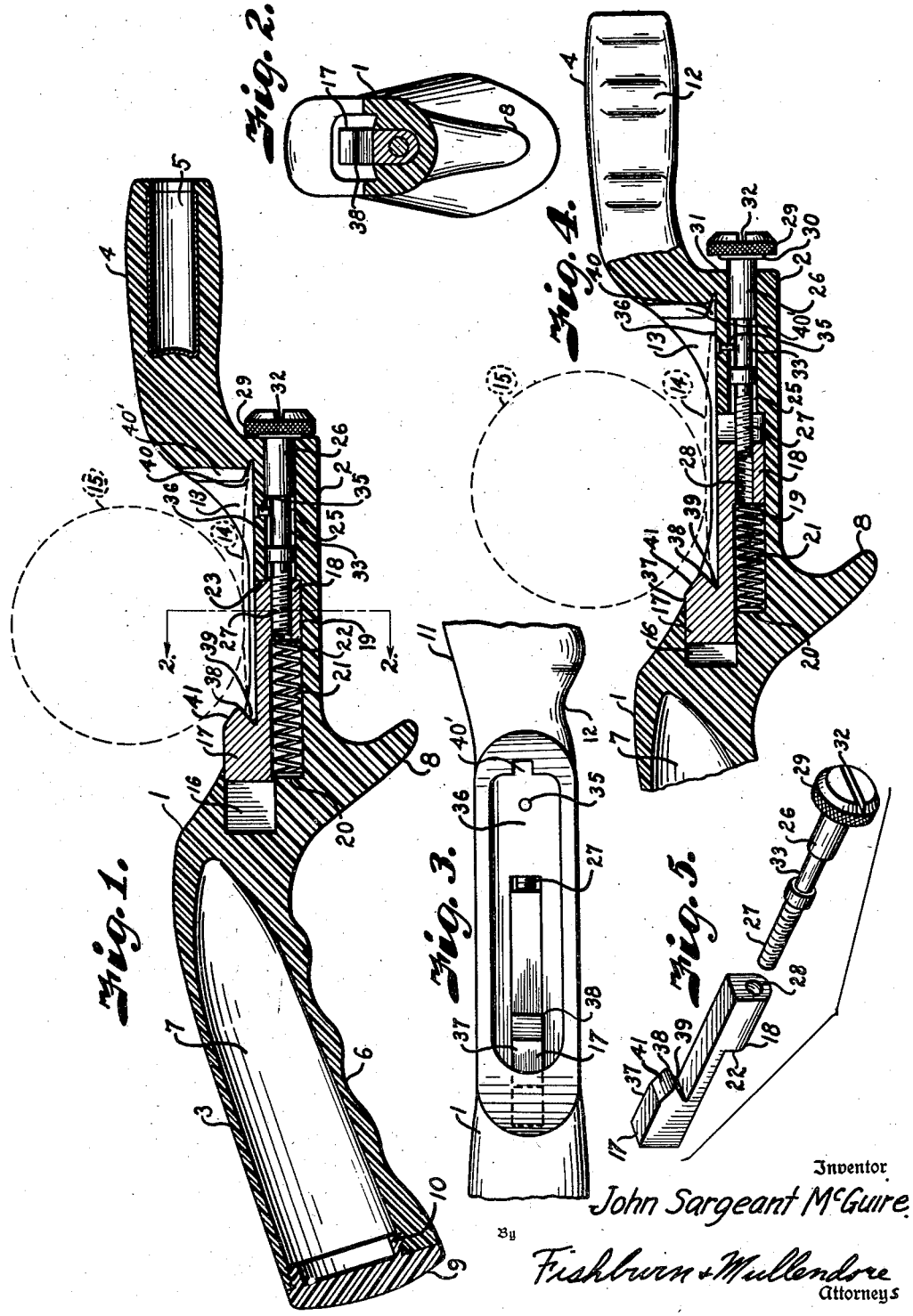
Inventor
John Sargeant McGuire
By
Fishburn & Mullendore
Attorneys Patented May 29, 1951

2,554,787

UNITED STATES PATENT OFFICE 2,554,787

FISHING ROD HANDLE

John Sargeant McGuire, Kansas City, Kans.

Application August 28, 1948, Serial No. 46,575

3 Claims. (Cl. 43—22)

This invention relates to fishing rod handles and is particularly adapted for the holding of reels within the handle when in use.

The principal objects of the present invention are to provide a handle for a fishing rod having a recess provided with a latch for retaining the reel within the recess portion, the latch being adapted for operation by the hand holding the handle; to provide a latching mechanism for the reel which will hold the reel firmly on the handle; to provide spring means on the latching mechanism for resiliently urging the latch against the reel base; to provide means for locking the latch in the handle; to provide a handle having a forwardly extending portion providing a handhold which may be grasped by one hand of the user so that the other hand may be free for winding the reel; to provide a hollow handle for the rod comprising a storage compartment; to provide a handle of light weight; and to provide a device of this character simple, economical to manufacture and efficient in operation.

In accomplishing these and other objects of the present invention, I have provided improved details of structure, the preferred form of which is illustrated in the accompanying drawings wherein:

Fig. 1 is a longitudinal sectional view of my improved handle showing the reel in dotted lines engaged by the latching means.

Fig. 2 is a transverse cross section through the latching part of the handle taken on the line 2—2, Fig. 1.

Fig. 3 is a top plan view of the latching mechanism.

Fig. 4 is a fragmentary view partly in cross section illustrating the handhold on the outer end of the handle.

Fig. 5 is a perspective disassembled view of the latching mechanism.

Referring more in detail to the drawings:

1 designates a fishing rod handle embodying the features of my invention comprising a frame 2 having a rear handhold 3 and a forwardly extending portion 4 forming a handhold and having a longitudinal socket 5 for receiving the end of the rod (not shown).

The handhold 2 is in the form of a pistol grip having finger portions 6 for gripping the handle and is shown hollowed as indicated at 7 forming a compartment for containing fish hooks or other fishing equipment as desired. The rear end of the frame 2 is provided with a finger portion 8 which extends downwardly and forwardly from the handhold and beneath the rear end of the frame 2. The rear end of the handhold 3 is provided with a removable cap 9, having threaded flanges 10 to engage in the threaded recess or socket 7 of the handhold 3 to close said opening. It will be noted that the handhold is extended at a downward angle rearwardly from the rear end of the frame 2 forming a natural grip for the hand.

The handhold 4 is carried by the frame 2 by an upwardly and forwardly extension of the frame and the left side is curved outwardly as indicated at 11 (Fig. 3) to form an enlarged portion to fit in the palm of one hand of the user and the right side is provided with finger-gripping portions or recesses as indicated at 12 (Fig. 4) so that the handle may be gripped firmly with one hand in front of the reel as desired while the other hand is free to operate the reel. Located in the upper part of the frame between the handhold 3 and forward handhold 4 is a recess 13 running longitudinally of the frame adapted to receive the base 14 of a reel 15. The recess 13 extends back into the rear end of the frame 2 forming a socket 16 for the rear end of an elongated latching member 17, the forward portion of the latching member 17 has an offset portion 18 forming an arm adapted to engage in a groove 19 formed in the lower portion of the recess 13, the rear end of the groove 19 forming a shoulder 20 against which the rear end of a coil spring 21 rests and the forward end of which engages against a shoulder 22 of the offset portion 18 of the latching member 17 to provide continuous compression on the latching member. The forward end of the latch rests against a shoulder 23 formed in the recess 13. The latching member 17 always remains in the recess 13 to prevent displacement therefrom.

The forward portion of the frame is provided with a longitudinal bore 25 extending to the groove 19 and adapted to receive a pin 26 having a threaded end 27 adapted to engage in a threaded bore 28 in the end of the latching member 17. The pin has a knurled head 29 forming a shoulder 30 adapted to engage against the end 31 of the forward portion of the frame. The knurled head is provided with a groove 32 to be engaged by a tool (not shown) if desired for turning of the pin 26. Pin 26 is provided with an annular groove 33 in which a pin 35 is adapted to engage. The transverse pin 35 extends through the wall 36 of the recess 13 of the frame 2 as best illustrated in Figs. 1 to 4 and limits the movement of the pin in the bore 25.

The latching member 17 is provided on its upper side with an enlarged portion 35 having a V-shaped extension 38 providing a groove 39 adapted to be engaged by one side of the base of the reel and the forward portion of the recess 13 is also provided with a transverse groove or notch 40 adapted to receive the opposite side of the base of the reel to hold the reel to the handle. A vertical slot 40' is provided in the forward end of the recess 13 at substantially the center thereof and intersects the transverse groove 40 to facilitate entry of the frame of the reel into the recess.

The length of movement of the latching member 17 in the recess 13 is provided by adjustment of the pin 26 in the bore 28 of the forward end of the latching member. When the pin is turned until the head engages the shoulder 26 of the frame, the latching member is locked in place and the reel cannot be removed from the handle. Loosening of the pin as shown in Fig. 4 will allow movement of the latching member in the groove against the compression of the spring 21 to release the base of the reel from the grooves 39 and 40, respectively. Release of the latching member from the base of the reel may be accomplished by backward pressure on the enlarged portion 37 of the latching member or by backward pressure on the knurled nut 29.

The base of the reel may be inserted in the groove and engaged by the latching member by backward movement of the latching member in the groove until the base engages in the grooves 39 and 40 or the forward side of the base may be inserted in groove 40 and downward pressure on the opposite side will cause the base to slide over the tapered portion 41 of the enlarged portion 37 of the latch until it comes to rest in the groove 39.

While my fishing rod handle is particularly adapted to be made of plastic material, other material such as aluminum or similar light material may be used.

This will be obvious from the foregoing that I have provided an improved fishing rod handle to which a fishing reel may be quickly attached and detached and one which is light and easily manipulated.

What I claim and desire to secure by Letters Patent is:

1. A fishing rod handle adapted to support a reel having a base plate comprising, a frame having a handhold on its rear end and a forwardly extending member provided with a socket for receiving the end of the fishing rod, said frame having a recess therein, said recess extending into the rear end of the frame and said recess having a groove in its bottom near the rear end thereof, said frame having a bore in the forward end connecting with said groove, a pin engaging in said bore having a threaded shank, a latching member for the reel slidable in said recess having an offset portion on one end, said offset portion having a transverse notch and the opposite end of said latch having a depending portion slidable in said groove and having a threaded bore opening for receiving the threaded shank of said pin, said depending portion of the latching member providing a shoulder, and a spring engaging against said shoulder and the rear end of said groove to provide compression on said latching member to hold said reel on said frame.

2. A fishing rod handle adapted to support a reel having a base plate comprising, a frame having a handhold on its rear end and a forwardly extending member provided with a socket for receiving the end of the fishing rod, said forwardly extending member being provided with an enlarged side for engagement in the palm of the hand and the opposite side provided with finger portions adapted to be grasped by the fingers of the user, said frame having a recess therein, the forward end of said recess terminating in a shoulder having a transverse groove for receiving one end of the base plate of said reel, said recess extending into the rear end of the frame and said recess having a groove in its bottom near the rear end thereof, said frame having a bore in the forward end connecting with said groove, a pin engaging in said bore having a threaded shank, a latching member for the reel slidable in said recess having an offset portion on one end, said offset portion having a transverse notch for receiving the opposite end of the base plate of the reel and having a depending portion on the other end slidable in said groove and having a threaded bore opening for receiving the threaded shank of said pin, said depending portion of the latch providing a shoulder, and a spring engaging against said shoulder and the rear end of said groove to provide compression on said latching member.

3. A fishing rod handle adapted to support a reel having a base plate comprising, a frame having a handhold on its rear end and a forwardly extending member provided with a socket for receiving the end of the fishing rod, said forwardly extending member being provided with an enlarged side to be engaged by the palm of the hand of a user and the opposite side provided with finger portions adapted to be grasped by the fingers of the user, said frame having a recess between the handhold and the forwardly extending portion, said recess having a groove in its bottom near the rear end thereof, said frame having a bore extending from said groove, a pin engaging in said bore having a threaded shank, a latching member slidable in said recess and having a depending portion slidable in said groove and having a threaded bore opening for receiving the threaded shank of said pin, said depending portion of the latch providing a shoulder, and a spring engaging against said shoulder and the rear end of said groove to provide compression on said latching member, the forward portion of said recess being provided with a transverse groove and the rear portion of said latch having an upstanding portion provided with a notch for engaging the base plate of the reel to retain the reel on said handle, the rear portion of the latch having an upstanding portion with a cam surface on its forwardly extending edge for guiding of the reel to the notch for retaining the reel on the handle.

JOHN SARGEANT McGUIRE.

REFERENCES CITED

The following references are of record in the file of this patent:

UNITED STATES PATENTS

| Number | Name | Date |
|---|---|---|
| 43,546 | Cummings | July 12, 1864 |
| 1,962,869 | Heddon | June 12, 1934 |
| 1,965,796 | Dunkelberger | July 10, 1934 |
| 2,180,323 | Maxwell | Nov. 14, 1939 |
| 2,289,216 | Seidel | July 7, 1942 |
| 2,465,744 | Olender | Mar. 29, 1949 |